US011461836B1

(12) United States Patent
Gaur

(10) Patent No.: US 11,461,836 B1
(45) Date of Patent: Oct. 4, 2022

(54) COMPUTER-IMPLEMENTED METHOD, SYSTEM, AND NON-TRANSITORY COMPUTER-READABLE MEDIUM FOR PROVIDING USER INTERFACE SELECTORS

(71) Applicant: Amazon Technologies, Inc., Seattle, WA (US)

(72) Inventor: Abhisheyk Gaur, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 16/748,479

(22) Filed: Jan. 21, 2020

(51) Int. Cl.
 *G06Q 30/06* (2012.01)
 *G06F 3/0482* (2013.01)

(52) U.S. Cl.
 CPC ....... *G06Q 30/0641* (2013.01); *G06F 3/0482* (2013.01); *G06Q 30/0627* (2013.01)

(58) Field of Classification Search
 CPC . G06Q 30/0601–0645; G06Q 30/0643; G06Q 30/0603; G06Q 30/0627; G06F 3/0482
 USPC ................................................ 705/26.1–27.2
 See application file for complete search history.

(56) References Cited

U.S. PATENT DOCUMENTS

| | | | | | |
|---|---|---|---|---|---|
| 8,856,090 | B1 * | 10/2014 | Honner | ............... | G06F 11/1004 707/697 |
| 2008/0082427 | A1 * | 4/2008 | Gandhi | ............... | G06Q 10/087 705/28 |
| 2012/0254092 | A1 * | 10/2012 | Malov | ............... | G06Q 30/0201 706/52 |
| 2013/0179309 | A1 * | 7/2013 | Heil | ............... | G06Q 10/087 705/28 |
| 2016/0132805 | A1 * | 5/2016 | Delacourt | ............... | G06F 8/71 705/7.23 |
| 2018/0047092 | A1 * | 2/2018 | Hennessy | ............... | G06Q 30/0641 |
| 2018/0108069 | A1 * | 4/2018 | Zedell | ............... | G06F 16/972 |
| 2018/0114223 | A1 * | 4/2018 | Dellostritto | ............... | G06Q 30/0633 |
| 2018/0308141 | A1 * | 10/2018 | Beck | ............... | G07G 1/01 |

(Continued)

FOREIGN PATENT DOCUMENTS

DE 102013019354 A1 * 5/2015 ............. G06Q 30/02

OTHER PUBLICATIONS

Zacks investment research: Snap's (SNAP) new dynamic ads target E-commerce advertisers (2019). . . Chatham: Newstex. Retrieved from https://dialog.proquest.com/professional/docview/2306517757?accountid=131444.*

(Continued)

*Primary Examiner* — Allison G Wood
*Assistant Examiner* — Katherine A Barlow
(74) *Attorney, Agent, or Firm* — Kilpatrick Townsend & Stockton LLP

(57) ABSTRACT

Systems and methods are provided describing interface selector techniques as implemented in a user interface of a computing device. The techniques include receiving a set of interface configuration instructions including an item unit of measure describing a quantity of an item in terms of a dimensional unit, generating a user interface based at least in part on the set of interface configuration instructions, generating a result value using the quantity value and the item unit of measure, and transmitting the user interface and the result value to a user device.

19 Claims, 12 Drawing Sheets

(56) References Cited

U.S. PATENT DOCUMENTS

2022/0137796 A1* 5/2022 Wang ..................... G06F 9/451
  715/764

OTHER PUBLICATIONS

Trujillo, Paul. "6 Important Inventory KPIs That Can Make or Break Your Warehouse" Business2Community.com (Year: 2016).*
Covert, Adrian. "Windows 8.1 is as good on small tablets as big ones" CNN Business, Money.CNN.com (Year: 2013).*
Chambers, John et al. "How to Choose the Right Forecasting Technique" Harvard Business Review. (Year: 1971).*

* cited by examiner

US 11,461,836 B1

COMPUTER-IMPLEMENTED METHOD, SYSTEM, AND NON-TRANSITORY COMPUTER-READABLE MEDIUM FOR PROVIDING USER INTERFACE SELECTORS

BACKGROUND

Items are often selected via user interfaces by various units, typically describing a unit of manufacture (e.g., a spool, a coil, a case, a box) or a minimum unit (e.g., an individual item). As such, selection and specification of item quantity via user interfaces may consider all selected items of an item type as fungible equivalents. In some cases, items vary in at least one unit of measure across different examples of the same item type. In some cases, variability introduces uncertainty in quantity selection and impairs user ability to effectively select a quantity of items. For example, in some cases, a user may intend to select a quantity that is not aligned with a relevant unit of manufacture, and may be forced to select a quantity above or below the user's actual intent.

BRIEF DESCRIPTION OF THE DRAWINGS

Various embodiments in accordance with the present disclosure will be described with reference to the drawings, in which.

DETAILED DESCRIPTION

Figure 1:
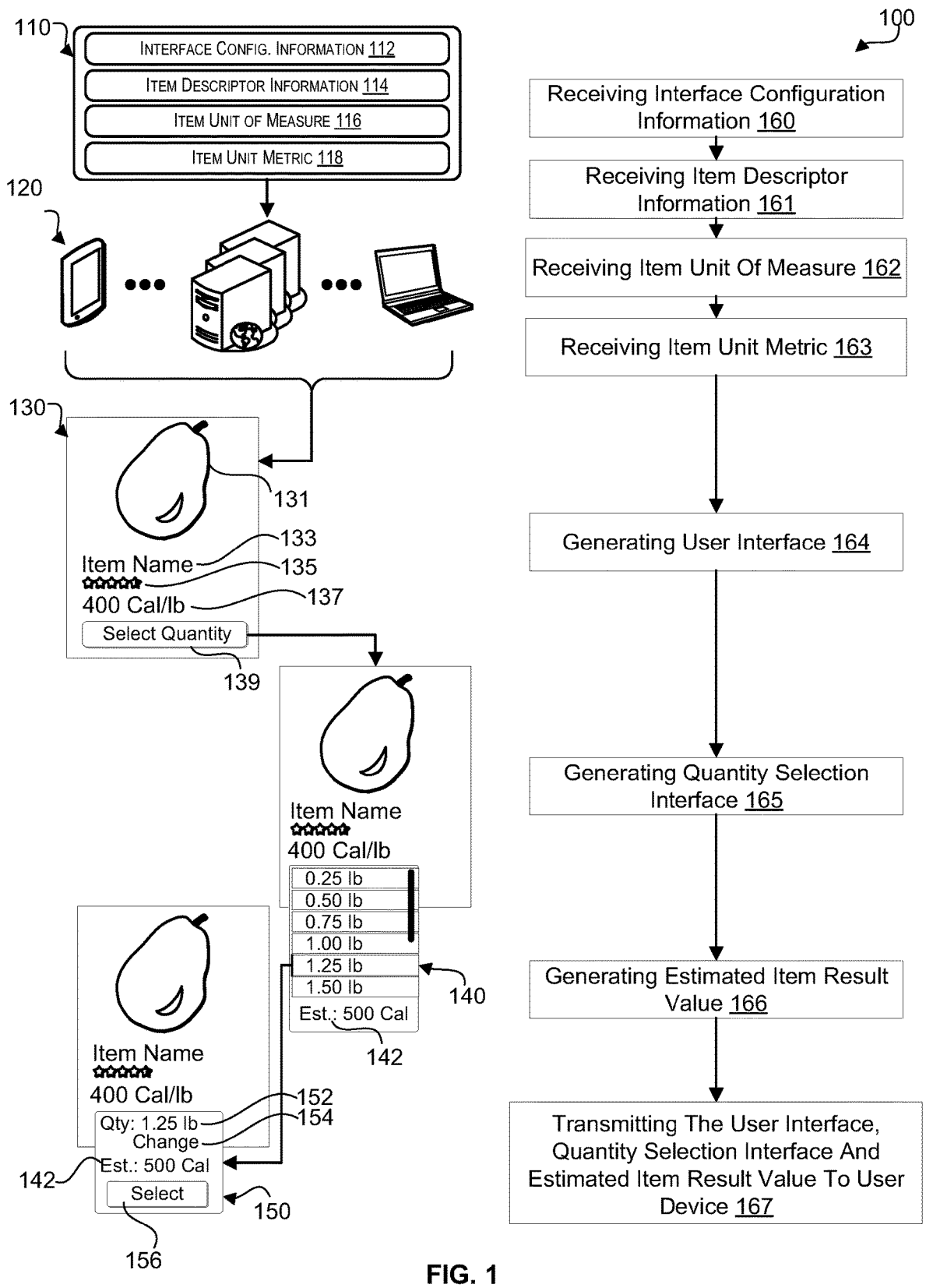
FIG. 1 is a block diagram illustrating an example technique for user interface selection, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In internet-based applications, item quantity selection is typically limited to integer multiples of units of manufacture and/or a minimum unit. For example, a retailer of goods may describe goods in fixed quantities according to the formats available from manufacturers higher up in a supply chain. This impairs the user experience by requiring users to estimate the final quantity of a desired unit of measure in terms of an integer multiple of the unit of manufacture. Integer multiple quantity selection is particularly ill-suited to items having a variable unit-dimension, for example, a variable per-unit weight. A user attempting to select a quantity of an item based at least in part on any unit of measure other than integer number, for example, a dimensional unit such as weight or calories, must estimate the number of items needed to meet that number, and may not be able to avoid selecting an excess quantity without selecting an insufficient quantity to meet the user's needs.

Techniques described herein include user interface selectors according to one or more embodiments of the present disclosure. Techniques for user selection of quantity may include, but are not limited to, a user selection according to a dimensional unit of measure (e.g., weight, length, and/or volume) and/or a non-dimensional unit of measure (e.g., number, spring constant, brilliance, Scoville units) provided with a dimensional or a non-dimensional estimation. In some cases, the user interface selector may include a metric (e.g., an increment of the unit of measure), whereby an item may be quantified by the metric.

A user interface may be provided to permit user interface selection of an item by a unit of measure. The item may include, but is not limited to, a household good (e.g., produce, dry goods, or the like), an industrial material (e.g., a chemical compound, a raw material, a manufactured good to be incorporated into a finished product, or the like), a bulk good (e.g., commodity-scale materials not meant for delivery to consumers), or the like. In some cases, a user making a selection of an item may intend to select a specific quantity of the item, based at least in part on a unit that is variable for diverse items of the item type. For example, a task may require a specific weight of a material relevant to that task, but the item may be available only in a variable-weight format (e.g., a formulation may specify a weight of a given material that may only be selected by a user interface in integer units of variable weight). A user making a selection of the variable-weight item may wish to select the specified weight, rather than by estimation via the integer number of items.

As an illustrative example, the user interface may present information about an item, including an image of the item, the name of the item, the producer or source of the item, etc. The user may review that information and decide to select the item. The user interface may allow the user to select a quantity of the item directly from the user interface by selecting the quantity in terms of a unit (e.g., as a number of pounds) using a menu or selector. For example, the user may press a button that prompts the user interface to generate a drop-down menu of weight values for which a quantity of the item may be selected. The user may then make a selection of a quantity, and the user interface may present an estimated combined value resulting from the user selection. For example, the user may select a combined weight, and the user interface may present an estimated number of items to produce that combined weight. In some cases, the user interface may present a different estimated value resulting from the user selection. The different estimated value may be an operative unit that the user wishes to optimize.

As a further example, a user interface may be configured to present an interface selector to receive a quantity selection of fruit that is described by a variable weight and a variable calorie count (e.g., two fruits from the same plant may be a different size and weight, and may contain different energy content as measured in calories). The user interface may be configured to receive a quantity selection in terms of a dimensional unit of measure (e.g. weight), a non-dimensional unit of measure (e.g., calorie count and/or integer number), an estimated weight per item (e.g., a weight per fruit, a weight per volume, etc.), or the like. The user interface may also be configured using one or more parameters included in an item unit metric, including, but not limited to, one or more unit increments by which a selection may be made (e.g., a fractional weight, a decimal weight, calorie increment, etc.). Using this information, the user interface may be configured to receive an item quantity selection, for example, by weight in fractional increments of fractional pounds.

In this example, the computer system may generate a quantity selection interface configured to include a drop-down menu of fractional weight increments, by which the user may make a selection of a specific weight (e.g., two and a half pounds of fruit). The menu may include a minimum selectable quantity and a maximum selectable quantity. Alternatively, the user interface may include a drop-down menu of number of fruits. In some cases, the computer system may generate and/or present one or more estimated parameters associated with the quantity selection to provide additional information via the user interface. For example, the computer system may generate an estimated final quantity, an estimated final calorie count, an estimated equivalent quantity in a second unit of measure, or the like. In this example, the computer system may generate and/or present an estimated price of the selected quantity of the fruit and/or an estimated number of fruits needed to meet the selected weight. For example, if the fruit is sold in units of approximately one-quarter pound per unit, a selection of one pound is equivalent to four fruits.

In some cases, the computer system may generate a user interface for selection of fruit by number of units, instead of by increments of fractional pounds. For example, the interface may be configured according at least in part to the interface configuration information to present the item descriptor information. In this example, however, the item unit of measure may be an integer number of fruits. The computer system may configure the user interface to present a drop-down menu for selecting a number of items and may generate an estimated weight according to the combined weight of each number in the drop-down menu. The computer system may configure the user interface to receive a quantity selection and to present an estimated weight in the interface. In addition, the computer system may generate an estimated calorie count for the sum weight of the fruit for presentation in the user interface.

Embodiments of this application are addressed to improving efficiency and performance of computer systems for online item selection. In some embodiments, the estimation and determination of an operative unit enables a computer system to reduce operational requirements and processing cycles in subsequent operations (e.g., when describing multiple item-types in a subsequent user interface), by providing the estimated value directly, as opposed to requiring the redundant implementation of calculation and display processes at multiple instances in a series of user interfaces. In some embodiments, the estimated value may be stored in memory, either locally on a user device and/or remotely in a data store, such that the estimated value may be referenced by queries originating from subsequent user interfaces. In this way, some embodiments of the present disclosure may reduce computational demands, power consumption, and data transmission requirements of one or more applications operating on the user device or served via a distributed computing system. In some embodiments, the present disclosure provides reduced power consumption, which in turn provides longer battery life in mobile devices, reduces operating temperature that increases processing speed, as well as other efficiency improvements.

FIG. 1 is a block diagram illustrating an example technique 100 for user interface selection, in accordance with at least one embodiment. In some embodiments, the technique 100 may permit a user to select a quantity of fruit based at least in part on estimating energy content, glycemic content, nutrients, etc., in a quantity of food items. In the example described above, the technique 100 may permit selection of a quantity of fruit and present to the user an estimated calorie count associated with the quantity of fruit. The quantity of fruit may be selected by a user and placed in a virtual basket, where the energy content, glycemic index, etc. is summed with other items previously selected to provide the user with an estimate of the total counts of the quantities of various food items selected.

To facilitate a quantity selection, a computer system 120 may receive configuration information 110 including, but not limited to, interface configuration information 112 (160), item descriptor information 114 (161), an item unit of measure 116 (162), an item unit metric 118 (163), or the like. In some cases, the computer system 120 may be a mobile device (e.g., a smartphone, a laptop, a tablet, etc.). In some cases, the computer system 120 may be a server or other content management device maintaining web content for serving to individual user devices, as described in more detail in reference to FIG. 11. In some cases, the interface configuration information 112 may include parameters by which the computer system will generate and/or present a user interface. This may include, but is not limited to, device specific configuration parameters, such as specifying layout, sizing, font size, resolution of images to be presented, bounding boxes, or the like. In some embodiments, the interface configuration information 112 may include a prefix, a suffix, a header, a footer, a device identifier, and/or a pre-defined set of interface configuration parameters. In some cases, the interface configuration information 112 may describe alternative configurations for multiple device types. For example, the interface configuration information 112 may include, but is not limited to, parameters for a mobile-browsing environment on a mobile device as described in more detail in reference to FIGS. 4-6, a browser-environment on a desktop computer or laptop computer as described in more detail in reference to FIG. 7, and/or an augmented reality environment designed for hands-free interaction with a user.

In some cases, the configuration information 110 may be specified in detail, based at least in part on the intent of a client with regard to how best to configure the interface, how to describe the item, etc. In some cases, the configuration information 110 may include one or more pre-set configurations, whereby the client need only provide item descriptor information, item unit of measure (e.g., weight), item unit metric, and/or operative unit information (e.g., energy content, carbohydrate, price, etc.). In some cases, the configuration information 110 may be provided as computer-executable instructions, as described in more detail in reference to FIGS. 11-12, such that the technique 100 includes incorporating one or more embodiments of the present disclosure into an existing user interface environment as a supplementary feature (e.g., a "plug-in" feature and/or module, implemented as a customizable template) to improve the user experience when selecting a quantity of an item. In this way, embodiments of the present disclosure may be incorporated in multiple existing user interfaces by multiple clients in different and/or customized implementations. For example, a user-interface selector template implementing technique 100 may be stored in a central data store as computer-executable instructions, such that a client may retrieve the template, customize it, and/or incorporate it into an existing user interface to provide one or more of the features described below to the existing user interface.

Based at least in part on the interface configuration information 112, the computer system 120 may generate a user interface 130 (164). In some cases, the user interface 130 may be configured to present the item descriptor information 114 according at least in part to one or more parameters included in the interface configuration information 112. The item descriptor information 114 may include, but is not limited to, an image of the item 131, an item name 133, a visual descriptor of item quality or popularity 135 (e.g., a rating, score, a poll result, etc.), a per unit characteristic 137 (e.g., calories, volume, price, glycemic index, etc.), and an interactive selector button 139 to facilitate quantity selection of the item. In some cases, the per unit characteristic 137 may be presented in terms of the item unit of measure 116, such that the user interface 130 presents the per unit characteristic in terms of the unit of measure (e.g., calories per pound as opposed to calories per pear).

In some cases, the computer system 120 may generate the user interface 130 configured to present a menu of quantity increments 140 according to the item unit metric 118 (165). In some cases, the item unit metric 118 may include a minimum quantity value, a maximum quantity value, and/or an item unit increment. In some cases, the user interface 130 may be generated as a client-side dynamic web page, wherein dynamic processes (e.g., determination of values) take place locally on the user device. In some cases, the user interface 130 may be generated as server-side dynamic web page, wherein dynamic processes take place at the server, with resulting data and/or values relayed to the user device. In some cases, the user interface 130 may be configured for implementation by a local application (e.g., an "app") operating on a user device, such that the user device receives configuration information 110, generates the user interface 130 locally, and presents it via components of the user device.

In some embodiments, the computer system 120 may receive and/or generate an estimated result value 142 as part of a number of result values (e.g., an array, table, matrix, or other ordered format) containing multiple result values in terms of a range of quantity values and operative units (166). In some cases, the computer system 112 may configure the user interface 130 to receive a quantity selection via the menu of quantity increments 140, and to present the estimated result value 142 based at least in part on the quantity selected, in reference to the number of result values. In some cases, the item descriptor information may include one or more types of functional descriptions relating the estimated result value 142 in terms of quantity and the item unit of measure 116. For example, the functional descriptions may include, but are not limited to a nonlinear function (e.g. a second order, logarithmic, or exponential), an arithmetic function, or a graduated schedule including one or more quantity ranges within which the estimated result is described by a function that may differ from those in other quantity ranges. In the example referenced above, the computer system 120 may generate the estimated result value 142 in reference to a number of calories in a selection of one and a quarter pounds of pairs, equivalent to 500 calories. In some cases, the result values may be stored locally on the user device, whereby the user interface may be configured to access local memory to present the estimated result value 142. In some cases, the result values may be stored on the computer system 120 and may be provided to the user device as needed, as described in reference to FIG. 11. In some embodiments, the computer system may configure the user interface 130 to dynamically request the estimated result value 142 from the computer system 120 such that the computer system 120 may generate the estimated result value 142 dynamically as a user navigates the user interface 130.

In some cases, the computer system may generate a user interface 130 that is configured to receive a selection of a specific weight by a form field configured to receive a numerical entry (e.g., an integer, a decimal, a fraction, etc.), for which the user interface will present a fellable text field instead of a drop down menu. For example, the user interface 130 may present a drop-down menu to receive a weight selection in pounds by quarter pound increments, up to a maximum quantity of ten pounds (e.g., the maximum quantity included in the item unit metric 118), in excess of which the computer system may replace the drop-down menu with a text-field to receive a quantity selection in decimal pounds above ten.

In some cases, once the quantity has been selected, the user interface may be configured to present the estimate in a selection menu 150 via the user interface 130. The selection menu 150 may include the quantity selected 152, the estimated total of the relevant unit of measure 142 (e.g., calories, carbohydrates, price, etc.), as well as a change button 154 to re-select a different quantity. In some cases, the user may place the item in the selected quantity in the virtual basket or cart via the selection menu 150, by pressing a selection button 156.

In some embodiments, the computer system 120 may transmit the user interface 130 to the user device as a server-side dynamic web-page or as a client-side dynamic web page (167). In some cases, the item descriptor information 114, the item unit of measure 116, the number of result values (e.g., as a lookup table or data array) and the item unit metric 118 are transmitted to the user device to be stored locally for use in client-side dynamic web page processes. As described previously, some embodiments include application implementations, wherein a user device receives configuration information 110 for generating and presenting the user interface 130 locally.

Figure 2:
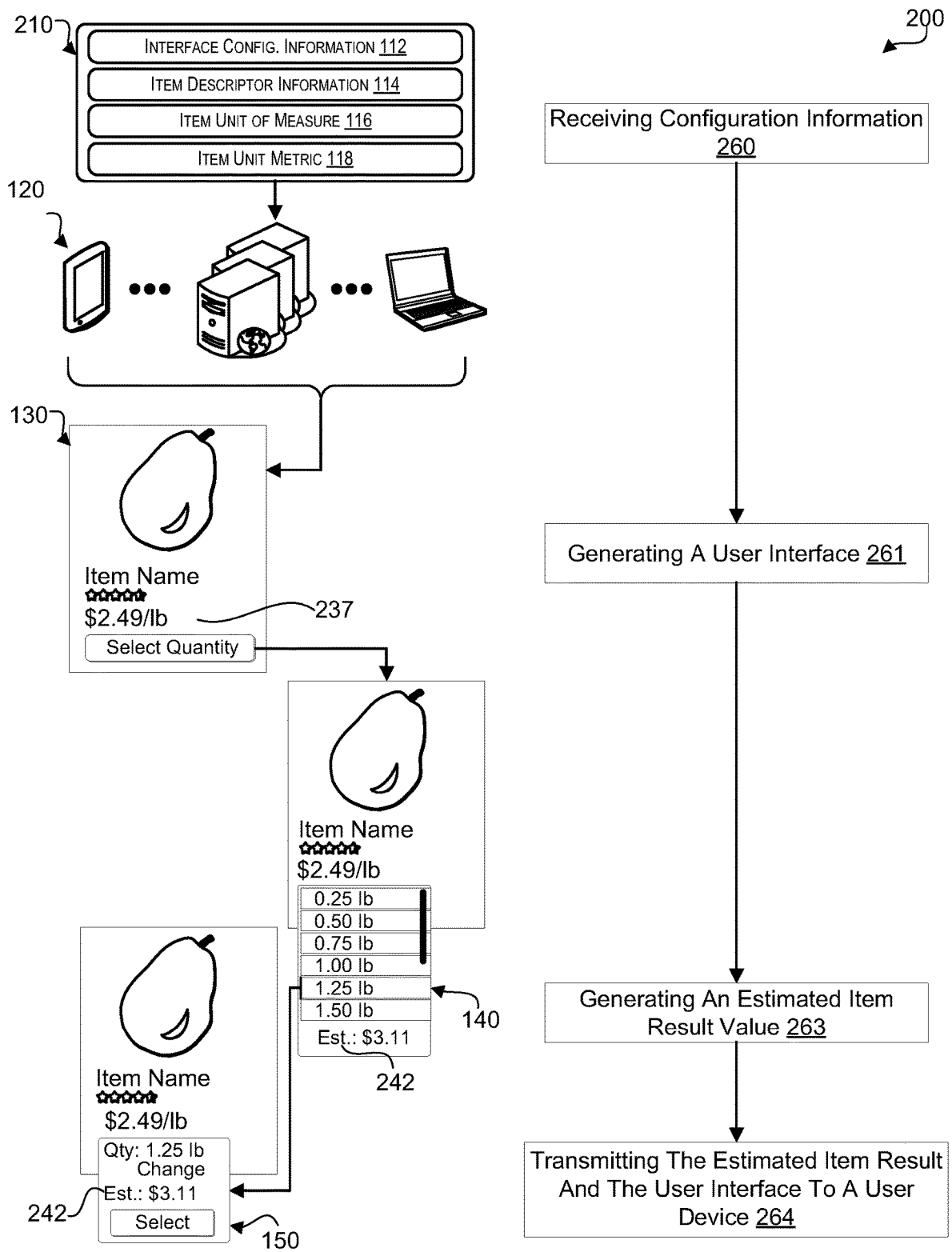
FIG. 2 is another block diagram illustrating another example technique for user interface selection, in accordance with at least one embodiment.

FIG. 2 is another block diagram illustrating another example technique 200 for user interface selection, in accordance with at least one embodiment. The technique 200 may permit the user to estimate a total price based at least in part on selection of a quantity of a variable-weight item via the user interface 130. As described in more detail in reference to FIG. 1, the user interface 130 may be generated by the computer system 120 based at least in part on a set of configuration information 210 received by the computer system 120 (260) that includes interface configuration information 112. In some embodiments, the item unit of measure 116 may be weight, the item unit metric 118 may include an item unit increment in terms of fractional and/or decimal weight, and the item descriptor information 114 may include a price per unit weight and an estimated price per unit increment. In some embodiments, the computer system 120 may generate the user interface 130 (261) to present the price per unit weight 237 in the user interface 130. In some embodiments, the computer system 120 may configure the user interface 130 to receive a quantity selection via the menu of quantity increments 140 (262), that may include the price information. The computer system 120 may also generate an estimated total weight 242 associated with a quantity selected via the menu 140 (263). As described in more detail in reference to FIG. 1, the menu 140 may include, but is not limited to, a drop-down menu of unit increments, a Tillable text field receiving a numerical entry, one or more incremental increase and/or decrease buttons, or the like. In the selection menu 150, the computer system may configure the user interface 130 to present the estimated total price 242 for the quantity selected, by which the user may select that quantity for placement in the virtual basket or cart (264).

Figure 3:
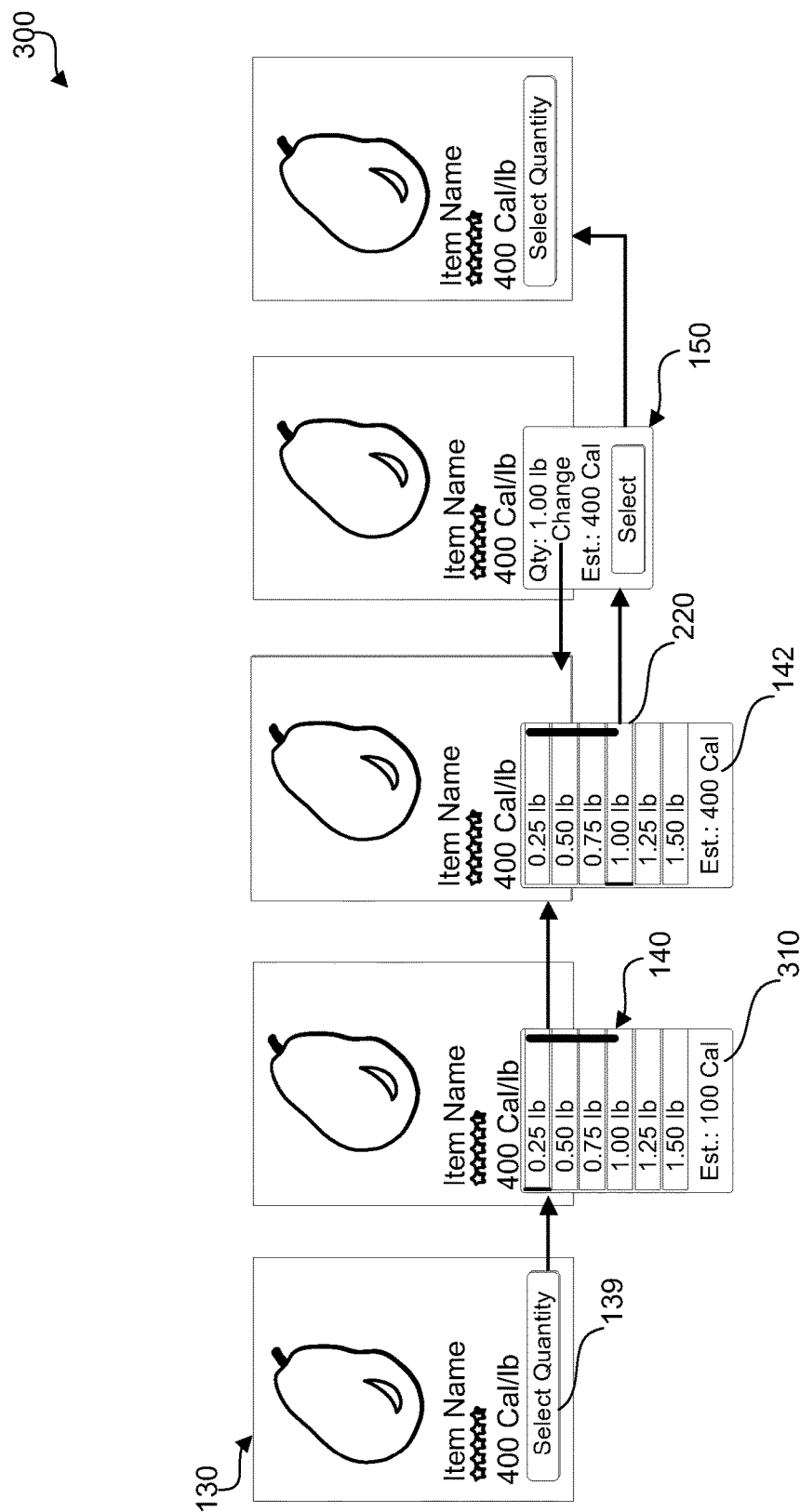
FIG. 3. is a diagram illustrating an example technique for user interface selection, in accordance with at least one embodiment.

FIG. 3. is a diagram illustrating an example technique 300 for user interface selection, in accordance with at least one embodiment. In some embodiments, the technique 300 provides the user interface 130 permitting a user to identify an item, for example by image and/or name, along with a measure of popularity or quality and/or an operative unit in terms of a dimensional unit by which the user may decide on a quantity selection. As described in more detail in reference to FIG. 1 and the illustrative example above, the operative unit may be energy content in calories. In some cases, the operative unit may be price, glycemic index, carbohydrate content, vitamin content, etc. In some cases, the user interface 130 may include a quantity selection button 139 that, when pressed, generates the menu of quantity increments 140, by which the user interface 130 receives the quantity selection. In some cases, user interface 130 presents a temporary result value 310 in terms of the operative unit based at least in part on the current selection, prior to receiving the quantity selection 220 via the menu of quantity increments 140, after which the estimated result value 142 is presented. As described in more detail in reference to FIG. 1, the temporary result value 310 and the estimated result value 142 may be generated by the computer system (e.g., computer system 120 of FIG. 1) based at least in part on functional relationships between an operative unit, an item unit of measure, and a range of quantity values as specified in configuration information (e.g., configuration information 110 of FIG. 1), whereby the user interface 130 may be configured to identify the estimated result value 310 corresponding to the current selection or the estimated result value 142 corresponding to the quantity selection 220. As described in more detail in reference to FIGS. 1-2, the computer system may configure the user interface 130 to present the estimated result value 142 via the selection menu 150 following receipt of the quantity selection 220, through which the quantity selection may be revised (e.g., change button 154 of FIG. 1) and/or finalized (e.g., selection button 156 of FIG. 1). In some cases, receiving a final selection prompts the user interface 130 to present the user interface 130 in its initial configuration, based at least in part on the configuration information (e.g., configuration information 110 of FIG. 1), configured to receive another quantity selection of the same item or a different item.

Figure 4:
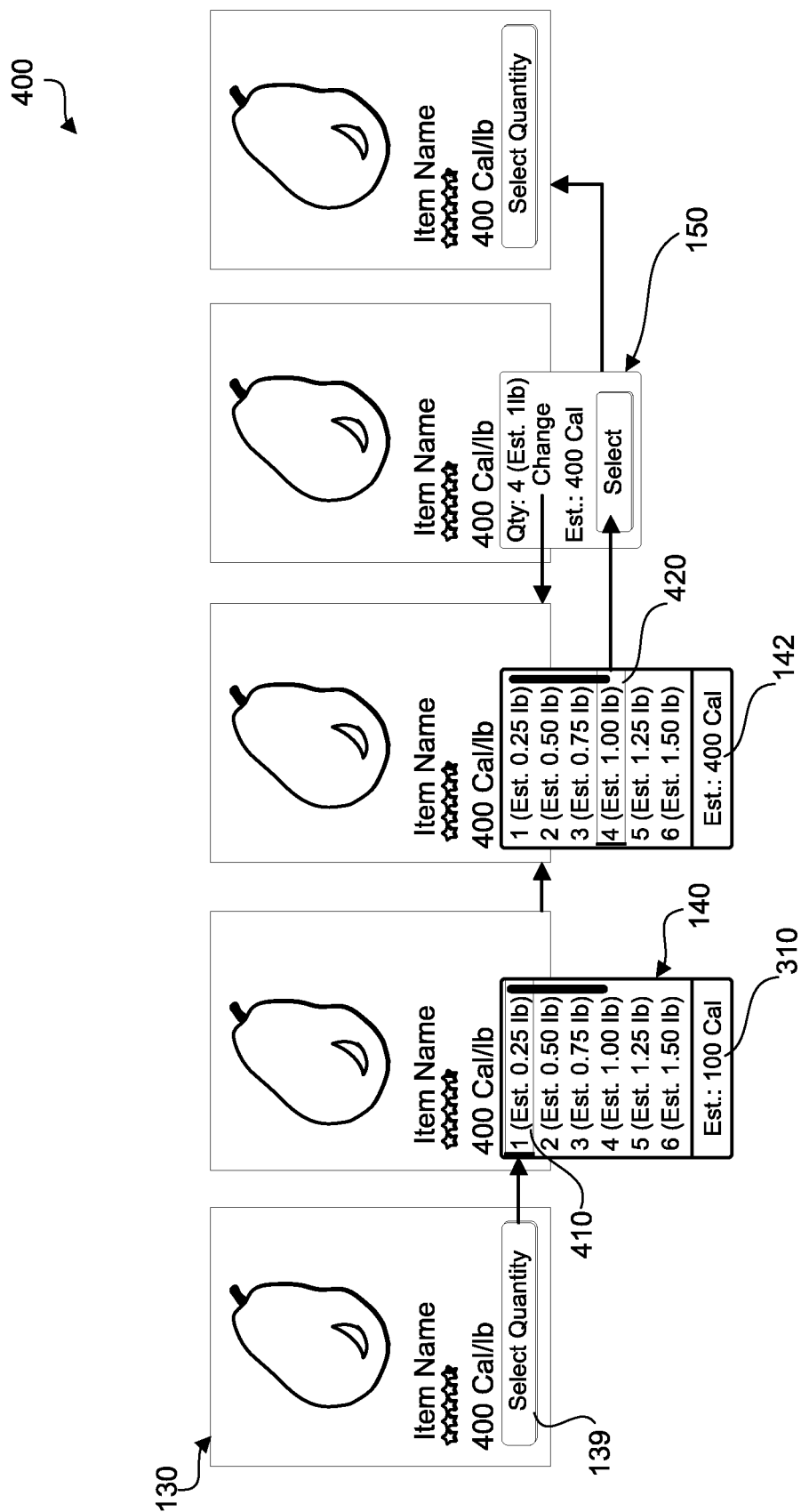
FIG. 4. is another diagram illustrating another example technique for user interface selection, in accordance with at least one embodiment.

FIG. 4. is another diagram illustrating another example technique 400 for user interface selection, in accordance with at least one embodiment. In some embodiments, the operative unit may be as described in reference to FIGS. 1-3. For example, the operative unit may be expressed in terms of a dimensional unit of measure and may include, but is not limited to, calories per weight, glycemic index per weight, carbohydrates per weight, price per weight, or the like, where weight is expressed in pounds, grams, etc. In some embodiments, technique 400 includes generating the user interface 130 to include the item descriptor information (e.g., item descriptor information 114 of FIG. 1), and the quantity selection button 139. In some cases, the menu of quantity increments 140 may provide unit increments in a non-dimensional unit (e.g., integer number of items) accompanied with an estimated value in terms of the dimensional unit of measure by which the operative unit is expressed. For example, the menu of quantity increments 140 may present a series of integer unit increments, accompanied by an estimated total weight associated with each integer unit increment (e.g., 0.25 lbs for 1, 0.50 lbs for 2, etc.). The computer system (e.g., computer system 120 of FIG. 1) may configure the user interface 130 to present the temporary result value 310 in terms of the operative unit for a temporary integer number selection 410 in the menu of quantity increments 140. In some cases, the computer system may configure the user interface 130 to receive a final integer number selection 420, determine and/or present the estimated result value 142, and present the selection menu 150, as described in more detail in reference to FIGS. 1-3.

Figure 5:
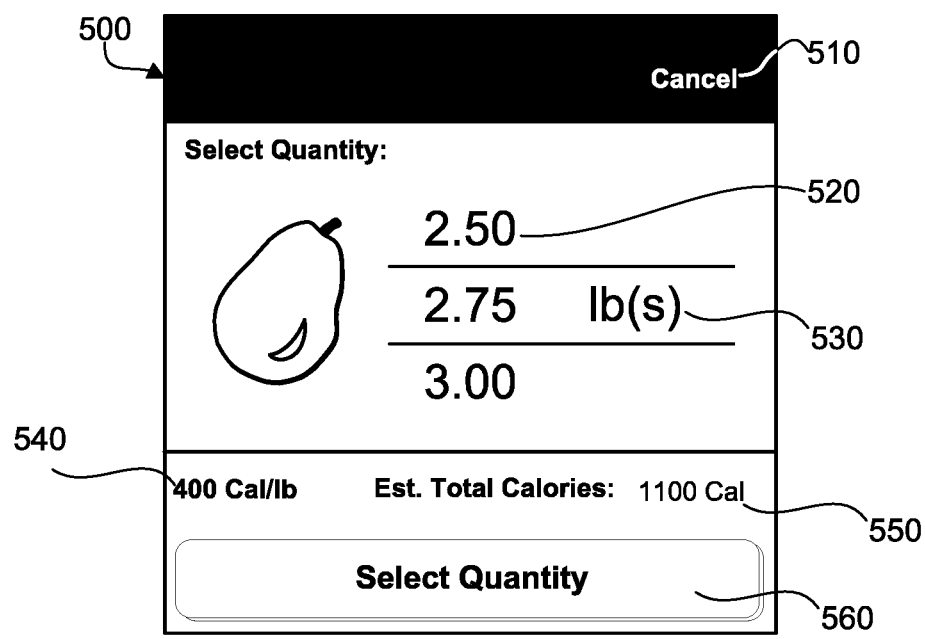
FIG. 5. is another diagram illustrating another example technique for user interface selection, in accordance with at least one embodiment.

FIG. 5. is another diagram illustrating another example technique for user interface selection, in accordance with at least one embodiment. In some embodiments, the configuration information (e.g., interface configuration information 110 of FIG. 1) may be used by the computer system (e.g., computer system 120 of FIG. 1) and/or a user device to generate a second user interface 500 to receive a quantity selection. In some cases, the second user interface 500 may include one or more menu controls 510 (e.g., a cancel button) to facilitate navigation in an online browsing environment including, but not limited to returning to the user interface (e.g., user interface 130 of FIG. 1). In some cases, the second user interface 500 includes one or more unit increments 520 arranged in a menu, which may be a scrollable menu for mobile device interface applications. In some cases, the unit increments may include a unit identifier 530 by which the unit increments 520 are labeled. In some cases, the second user interface 500 may present the operative unit in terms of the unit of measure 540, as received in item descriptor information (e.g., item descriptor information 114 of FIG. 1), and may present a temporary estimated result 550 value via the second user interface. The second user interface 500 may include a selection button 560 to receive the quantity selection.

Figure 6:
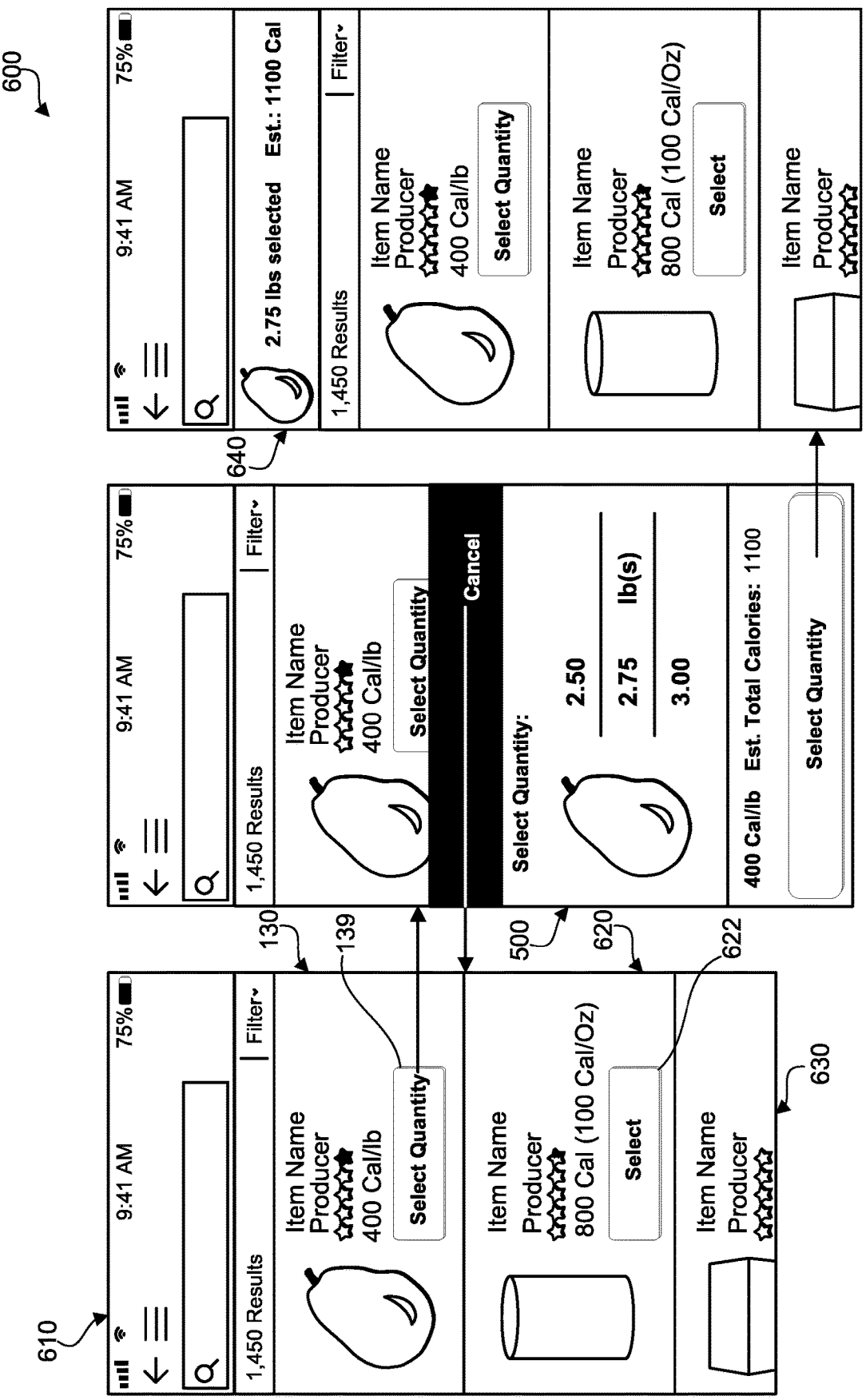
FIG. 6. is another diagram illustrating another example technique for user interface selection, in accordance with at least one embodiment.

FIG. 6. is another diagram illustrating another example technique 600 for user interface selection, in accordance with at least one embodiment. In some embodiments, the user interface 130 is configured for a mobile device presenting a mobile browsing environment 610. The mobile browsing environment 610 may include the user interface 130 as one of a plurality of user interfaces in a scrollable list of items. In some embodiments, a second item 620 may be included that is sold by unit of manufacture, for which a selection button 622 is presented, rather than the quantity selection button 139, as described in more detail in reference to FIGS. 1-5. In some cases, the mobile browsing environment 610 includes a third item 630. In some cases, the quantity selection button 139 is configured to cause the user interface 130 to present the second user interface 500, as described in more detail in reference to FIG. 5, overlaid on the mobile browsing environment 610 such that the user interface 130 may be partially or completely occluded. The second user interface 500 may be configured to receive the quantity selection. The mobile browsing environment 610 may then generate and/or present a quantity selection notification 640, that may include item descriptor information (e.g., item descriptor information 114 of FIG. 1), the quantity selected, and/or the estimated result value in terms of the operative unit (e.g., estimated result value 142 of FIG. 1). As described in more detail in reference to FIG. 1, technique 600 may permit quantity selection via an online browser in specific increments to meet the intent of a user of the mobile device. Rather than restrict quantity selection to integer units of manufacture, as with the second item 620, variable-unit items may be selected by unit of measure directly, thereby reducing waste and inefficiency and improving user experience.

Figure 7:
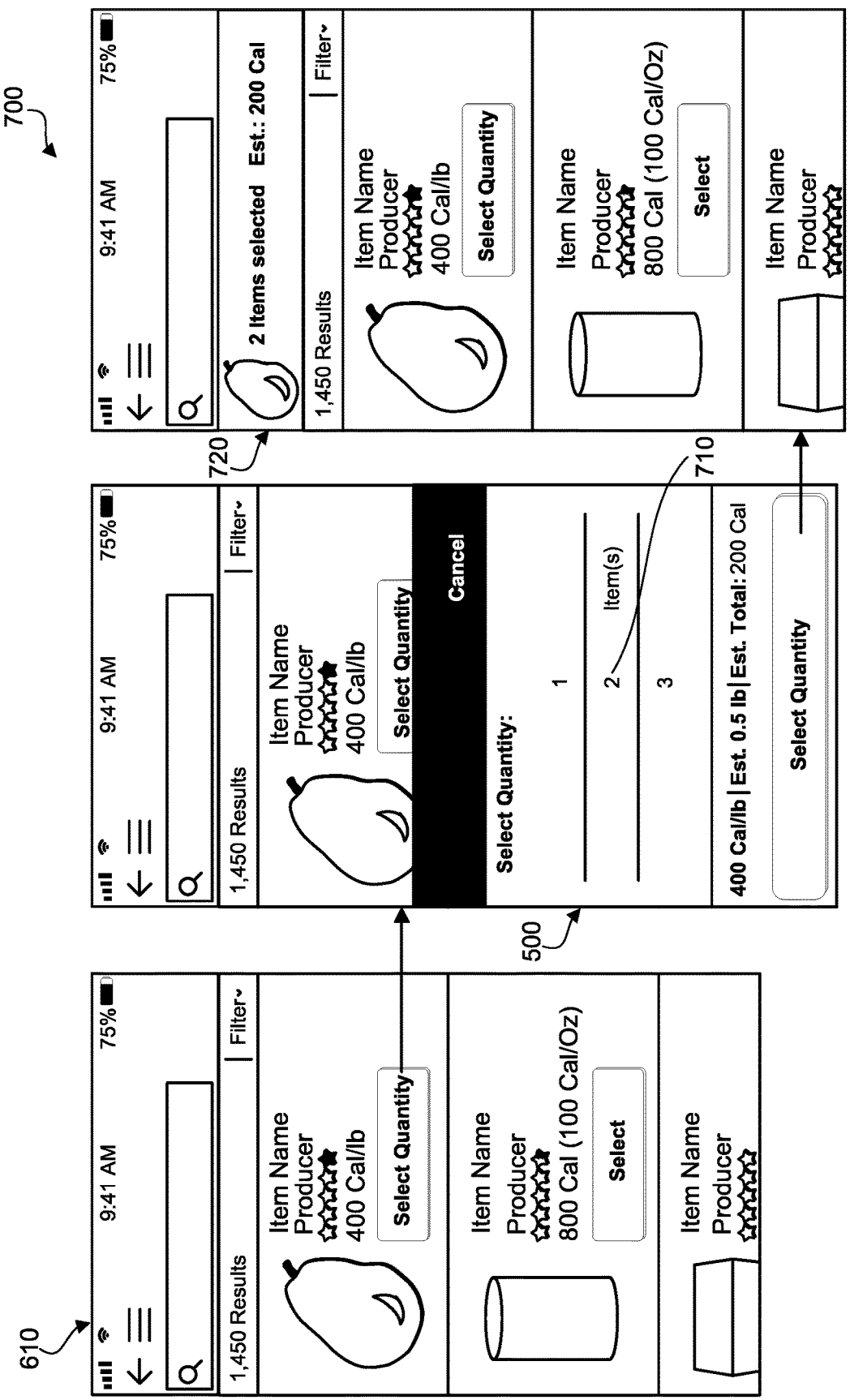
FIG. 7. is another diagram illustrating another example technique for user interface selection, in accordance with at least one embodiment.

FIG. 7. is another diagram illustrating another example technique 700 for user interface selection, in accordance with at least one embodiment. In some embodiments, technique 700 includes receiving an integer quantity selection 710 via the second interface 500 in terms of integer number of items. In some cases, a user may intend to select a number of items, without regard to the variation in a dimensional measure of each individual item. For example, in the illustrative example described above, a user may intend to select a number of fruits to consume daily, and may wish to estimate the energy content of the daily quantity. In this example, the user interface may be configured by a computer system (e.g. computer system 120 of FIG. 1) to receive the integer quantity selection 710 via the second user interface 500 implemented in the mobile browsing environment 610. In some cases, the second interface 500 may present a temporary estimated result value along with the selected quantity, item descriptor information, and/or the estimated quantity in terms of a dimensional unit of measure (e.g., weight). The second user interface may be configured to receive the final quantity selection and to generate a quantity selection notification 720 that may include item descriptor information, the quantity selected in terms of a number of items, and/or the estimated result value in terms of the operative unit.

Figure 8:
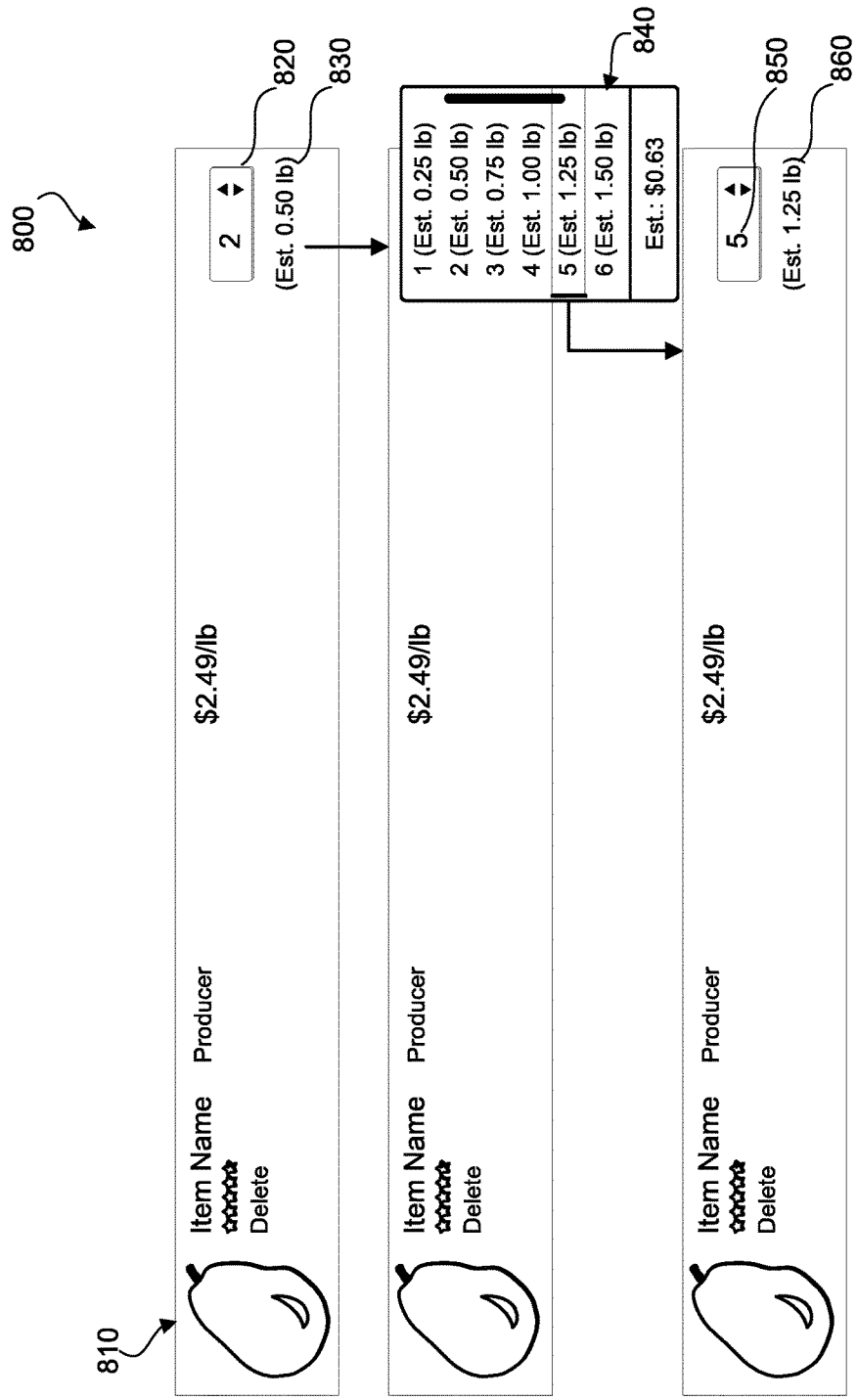
FIG. 8. is another diagram illustrating another example technique for user interface selection, in accordance with at least one embodiment.

FIG. 8. is another diagram illustrating another example technique 800 for user interface selection, in accordance with at least one embodiment. In some embodiments, the computer system (e.g., computer system 120 of FIG. 1) implements technique 800 by generating the user interface (e.g., user interface 130 of FIG. 1) in a web-browser environment 810 (e.g., a web browser implemented in a laptop, desktop, and/or web terminal). In some cases, the user interface may include the item descriptor information (e.g., item descriptor information 114 of FIG. 1) and/or one or more buttons 820 to facilitate quantity selection via the user interface. In some cases, the user interface may include a temporary estimated result value 830 prior to quantity selection. In some embodiments, the buttons 820 may include a drop-down menu button to select a number of items, as described in more detail in reference to FIG. 4 and FIG. 7. In some embodiments, the buttons 820 may include other forms, as described previously. In some cases, the buttons 820 may prompt the user interface to present a unit increment menu 840 in the user interface, as described in more detail in reference to FIGS. 1-7, which may include an estimated quantity in terms of a dimensional unit of measure (e.g., the item unit of measure 116 of FIG. 1). In some cases, the unit increment menu 840 may be generated as a second user interface, as described in more detail in reference to FIG. 5. In some cases, the user interface may be configured to present the estimated result value 860, along with the quantity selection 850 in the web-browser environment 810, thereby permitting the user to review the intended value of the operative unit and/or the unit of measure.

Figure 9:
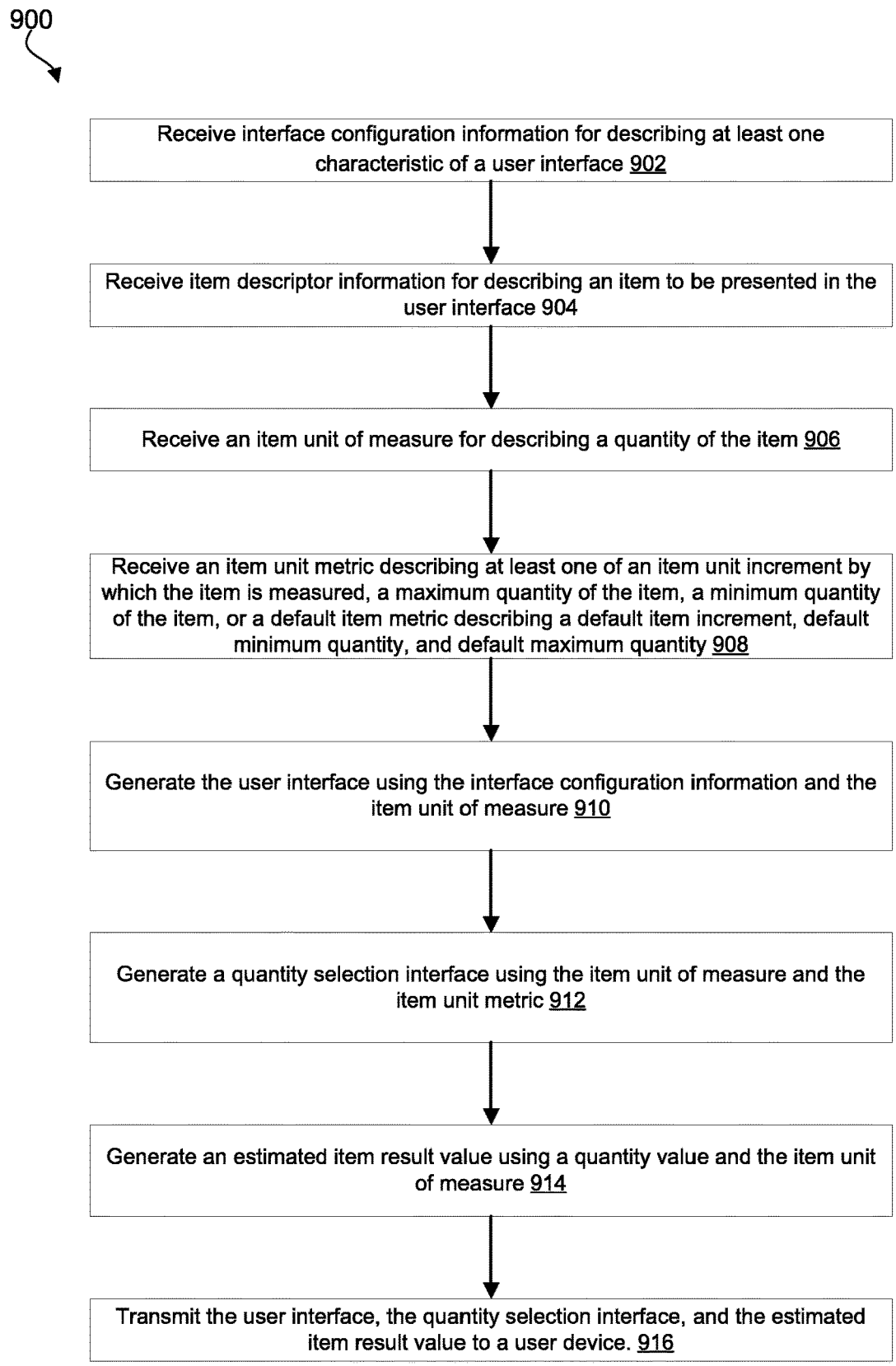
FIG. 9. is a flowchart illustrating an example of a process for user interface selection according to certain embodiments.
Figure 10:
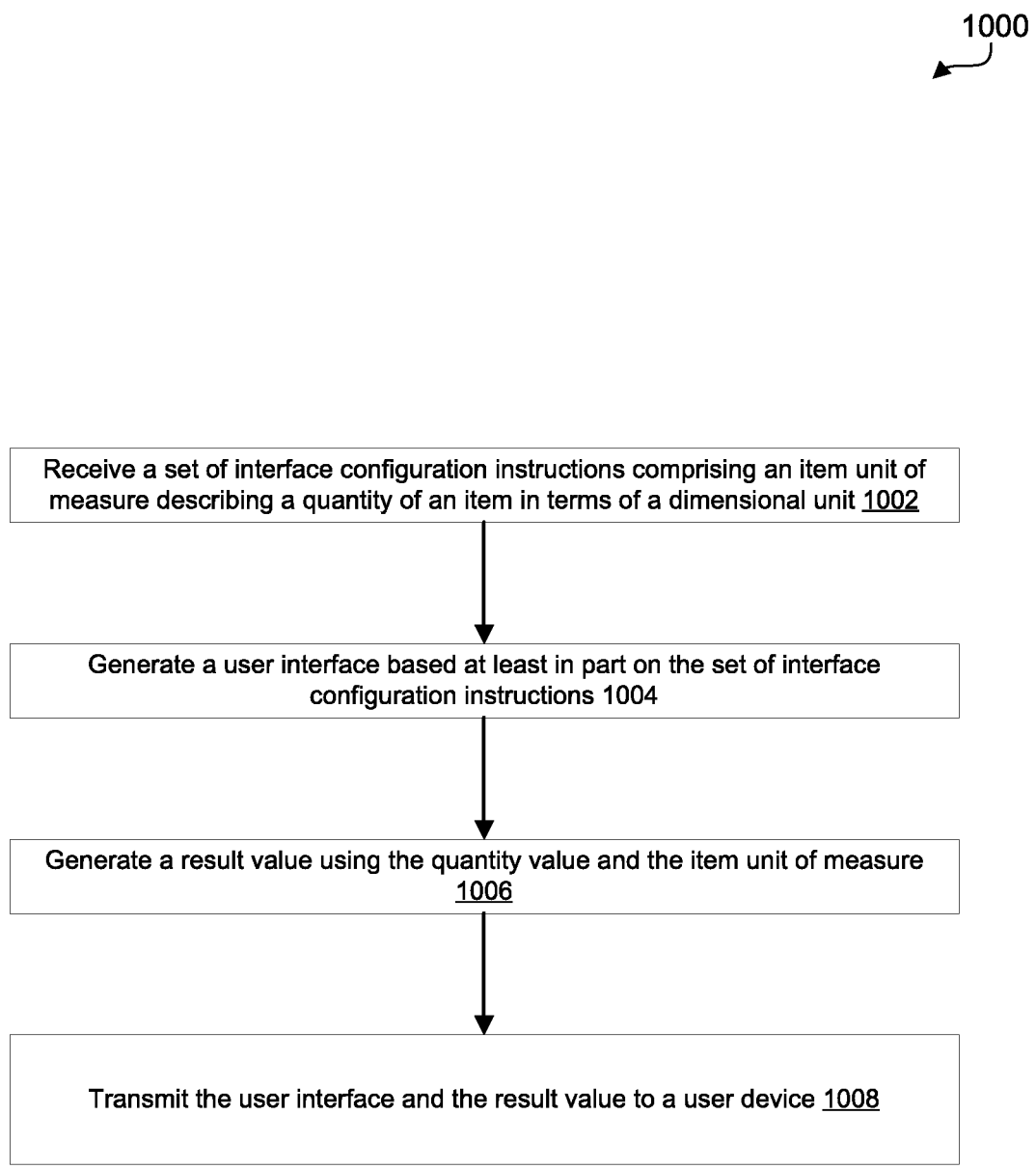
FIG. 10. is another flowchart illustrating an example of a process for user interface selection according to certain embodiments.

FIGS. 9-10 illustrate example flow charts for automated validation techniques, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, or the like that perform particular functions or implement particular data types. The order in which the operations are described is not intended to be construed as a limitation, and any number of the descried operations can be combined in any order and/or in parallel to implement the process. Some or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. In some embodiments, the computer-readable storage medium may be non-transitory.

FIG. 9. is a flowchart illustrating an example of a process 900 for user interface selection according to certain embodiments. Process 900 may begin with operation 902, where the computer system receives interface configuration information for describing at least one characteristic of a user interface. As described in more detail in reference to FIG. 1, the interface configuration information may be describe the layout and presentation of the user interface to present an item and facilitate quantity selection by a user in terms of a dimensional unit of measure and/or an operative unit. In some embodiments, the interface configuration information may be pre-configured and stored in the computer system, as described in more detail in reference to FIG. 1, to conform to one or more devices (e.g., mobile browsing, web browsing, television interface, augmented reality, etc.).

In operation 904, the computer system receives item descriptor information for describing an item to be presented in the user interface. As described in more detail in reference to FIG. 1, the item descriptor information may include an operative unit (e.g., calories, carbohydrates, price, capsaicin content, chemical activity, etc.) and may include other descriptive information used by the computer system to identify and describe the item (e.g., an image, a producer, a popularity value, etc.). In some cases, the operative unit may be described in terms of a unit of measure (e.g., calories per unit weight).

In operation 906, the computer system receives an item unit of measure for describing a quantity of the item. As described in more detail in reference to FIG. 1, the unit of measure may be a dimensional unit (e.g., weight), by which the computer system may receive a quantity selection. For example, the computer system may receive a quantity selection in terms of the unit of measure (e.g., pounds), to later generate an estimated result value in terms of the operative unit (e.g., calories). In operation 908, the computer system receives an item unit metric describing at least one of an item unit increment by which the item is measured, a maximum quantity of the item, a minimum quantity of the item, or a default item metric describing a default item increment, default minimum quantity, and default maximum quantity. As described in more detail in reference to FIG. 1, the item unit metric enables the computer system to configure the user interface to receive a quantity selection in quantities more closely approaching the intent of a user of the user interface (e.g., the interface 130 of FIG. 1). As such, the item unit metric may improve the user experience and may reduce waste.

In operation 910, the computer system generates the user interface using the interface configuration information and the item descriptor information. As described in more detail in reference to FIG. 1. In operation 912, the computer system generates a quantity selection interface using the item unit of measure and the item unit metric. Optionally, the operations may include receiving a user interface template from a data store. In addition, generating the user interface further may optionally include using the user interface template, and generating the quantity selection interface may optionally include using the user interface template. In operation 914, the computer system receives a quantity value via the quantity selection interface in terms of the item unit of measure and the item unit increment. Optionally, generating the estimated item result value further includes generating an estimated dimensional quantity in terms of the item unit of measure and an integer number quantity. Optionally, the interface configuration information, the item descriptor information, the item unit of measure, the item unit metric, are configured by a client and received by the computer system via the data store as computer-executable instructions included in the user interface template.

In operation 916, the computer system transmits the user interface, the quantity selection interface, and the estimated item result value to a user device. As described in more detail in reference to FIG. 1, the user device may include a mobile device, a desktop computer, or any suitable device for internet browsing, and the estimated item result value may include a table of estimated result values in terms of a plurality of item quantity values and item descriptor information including, but not limited to, the operative unit.

FIG. 10. is another flowchart illustrating an example of a process for user interface selection according to certain embodiments. In operation 1002, the computer system receives a set of interface configuration instructions comprising an item unit of measure describing a quantity of an item. Optionally, the set of interface configuration instructions further comprises an item unit metric, describing at least one of an item unit increment by which the item is measured, a maximum quantity of the item, a minimum quantity of the item, or a default item unit metric describing a default item increment, default minimum quantity, and default maximum quantity. The interface configuration instructions may include the configuration information (e.g. configuration information 110 of FIG. 1) as described in more detail in reference to FIG. 1. Optionally, the interface configuration information may include at least one of a prefix, a suffix, a header, a footer, a device identifier, or a pre-defined set of interface configuration parameters. Optionally, the set of interface configuration instructions comprises a user interface template configured to receive interface configuration information, item descriptor information, an item unit of measure, and an item unit metric. Optionally, the set of interface configuration instructions is configured by a client and is received by one or more processors included in the computer system via a data store as computer-executable instructions. Optionally, operations may further include receiving item descriptor information comprising at least one of an operative unit describing one or more characteristics of the item in terms of the item unit of measure, an item name, an image of the item, a source identifier of the item, or a characteristic quality value at least in part describing a popularity or a quality of the item.

In operation 1004, the computer system generates a user interface based at least in part on the set of interface configuration instructions. Optionally generating a user interface includes receiving an item selection via the user interface, generating a second user interface associated at least in part with the item selection, presenting the item descriptor information via the second user interface, receiving the quantity value via the second user interface, and closing the second user interface. Optionally, the operations further include generating a quantity selection interface using the set of interface configuration instructions, such that the quantity selection interface includes one or more selectable quantity values associated at least in part with the item unit increment in a range from the minimum quantity of the item to the maximum quantity of the item, and a user-Tillable field configured to receive a quantity value exceeding the maximum quantity of the item from a user of the quantity selection interface. Optionally, the quantity value includes an integer number quantity or a dimensional quantity value in terms of the item unit of measure and the item unit increment, such that the computer system is further configured to generate an estimated item quantity in terms of the item unit of measure using the integer number quantity. In operation 1006, the computer system generate a result value using a quantity value and the item unit of measure. In operation 1008, the computer system transmits the user interface and the result value to a user device.

Figure 11:
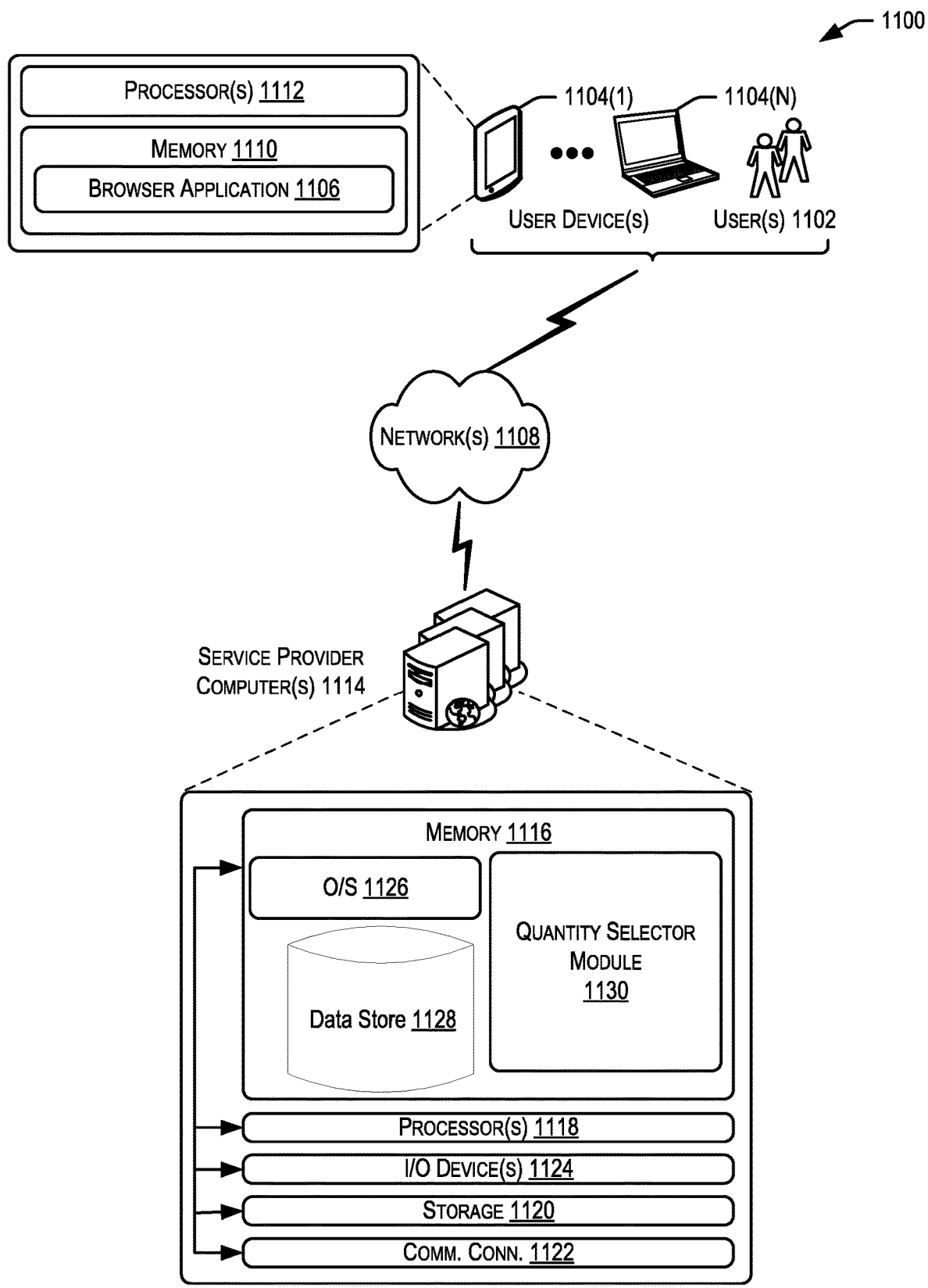
FIG. 11. is a diagram illustrating an example architecture for implementing a user interface selection technique, in accordance with at least one embodiment.

FIG. 11. is a diagram illustrating an example architecture for implementing a user interface selection technique, in accordance with at least one embodiment. In architecture 1100, one or more users 1102 (e.g., customers, users, consumers, etc.) may utilize user computing devices 1104(1)-(N) (collectively, user devices 1104) to access a browser application 1106 or a user interface (UI) accessible through the browser application 1106, via one or more networks 1108. The "browser application" 1106 can be any browser control or native application that can access and display a network page or other information such as a user interface of a native software application for enabling the selection or interaction of content. A native software application may include an application or program that has been developed for use on a particular system (such as an operating system) or a particular device (such as a particular type of mobile device or user device 1104). In embodiments, the user device 1104 may include one or more components for enabling the user 1102 to interact with the browser application 1106.

The user devices 1104 may include at least one memory 1110 and one or more processing units or processor(s) 1112. The memory 1110 may store program instructions that are loadable and executable on the processor(s) 1112, as well as data generated during the execution of these programs. Depending on the configuration and type of the user devices 1104, the memory 1110 may be volatile (such as random access memory (RAM)) and/or non-volatile (such as read-only memory (ROM), flash memory, etc.). The user devices 1104 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1104. In some implementations, the memory 1110 may include multiple different types of memory, such as static random access memory (SRAM), dynamic random access memory (DRAM), or ROM.

Turning to the contents of the memory 1110 in more detail, the memory 1110 may include an operating system and one or more application programs or services for implementing the techniques disclosed herein. Additionally, the memory 1110 may include one or more modules for implementing the techniques described herein including a quantity selection module 1130.

The architecture 1100 may also include one or more service provider computers 1114 that may, in some examples, provide computing resources such as, but not limited to, client entities, low latency data storage, durable data store, data access, management, virtualization, hosted computing environment or "cloud-based" solutions, electronic content performance management, etc. The service provider computers 1114 may implement or be an example of the service provider computer(s) described herein with reference to FIGS. 1-6 and throughout the disclosure. The one or more service provider computers 1114 may also be operable to provide site hosting, computer application development, and/or implementation devices, combinations of the foregoing, or the like to the one or more users 1102 via user devices 1104.

In some examples, the networks 1108 may include any one or a combination of many different types of networks, such as cable networks, the Internet, wireless networks, cellular networks, and other private and/or public networks. While the illustrated examples represents the users 1102 communicating with the service provider computers 1114 over the networks 1108, the described techniques may equally apply in instances where the users 1102 interact with the one or more service provider computers 1114 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1114 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1114 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1114 may be in communication with the user device 1104 via the networks 1108, or via other network connections. The one or more service provider computers 1114 may include one or more servers, perhaps arranged in a cluster or as individual servers not associated with one another.

In one illustrative configuration, the one or more service provider computers 1114 may include at least one memory 1116 and one or more processing units or processor(s) 1118. The processor(s) 1118 may be implemented as appropriate in hardware, computer-executable instructions, firmware, or combination thereof. Computer-executable instruction or firmware implementations of the processor(s) 1118 may include computer-executable or machine-executable instructions written in any suitable programming language to perform the various functions described when executed by a hardware computing device, such as a processor. The memory 1116 may store program instructions that are loadable and executable on the processor(s) 1118, as well as data generated during the execution of these programs. Depending on the configuration and type of the one or more service provider computers 1114, the memory 1116 may be volatile (such as RAM) and/or non-volatile (such as ROM, flash memory, etc.). The one or more service provider computers 1114 or servers may also include additional storage 1120, which may include removable storage and/or non-removable storage. The additional storage 1120 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1116 may include multiple different types of memory, such as SRAM, DRAM, or ROM.

The memory 1116, the additional storage 1120, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1116 and the additional storage 1120 are all examples of non-transitory computer storage media. Additional types of non-transitory computer storage media that may be present in the one or more service provider computers 1114 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1114. Combinations of any of the above should also be included within the scope of non-transitory computer-readable media.

The one or more service provider computers 1114 may also contain communication connection interface(s) 1122 that allow the one or more service provider computers 1114 to communicate with a data store, another computing device or server, user terminals, and/or other devices on the networks 1108. The one or more service provider computers 1114 may also include I/O device(s) 1124, such as a keyboard, a mouse, a pen, a voice input device, a touch input device, a display, speakers, a printer, etc.

Turning to the contents of the memory 1116 in more detail, the memory 1116 may include an operating system 1126, one or more data stores 1128, and/or one or more application programs or services for implementing the techniques disclosed herein including the quantity selection module 1130. In accordance with at least one embodiment, the quantity selection module 1130 may be configured to receive a set of interface configuration instructions comprising an item unit of measure describing a quantity of an item in terms of a dimensional unit; generate a user interface based at least in part on the set of interface configuration instructions; generate a result value using a quantity value and the item unit of measure; and transmit the user interface and the result value to a user device. In some embodiments, the set of interface configuration instructions further comprises an item unit metric comprising at least one of an item unit increment by which the item is measured, a maximum quantity of the item, a minimum quantity of the item, or a default item unit metric comprising at least one of a default item increment, a default minimum quantity, or a default maximum quantity. In some embodiments, the quantity selection module 1130 is further configured to generate a quantity selection interface using the set of interface configuration instructions, the quantity selection interface comprising at least one of one or more selectable quantity values associated at least in part with the item unit increment in a range from the minimum quantity of the item to the maximum quantity of the item; or a user-fillable field, configured to receive a custom quantity value exceeding the maximum quantity of the item from a user of the quantity selection interface. In some embodiments, the quantity value comprises an integer number quantity or a dimensional quantity value in terms of the item unit of measure and the item unit increment, wherein the computer system is further configured to generate an estimated item quantity in terms of the item unit of measure using the integer number quantity. In some embodiments, the set of interface configuration instructions is configured by a client and is received by the one or more processors via a data store as computer-executable instructions. In some embodiments, the set of interface configuration instructions comprises a user interface template configured to receive interface configuration information, item descriptor information, an item unit of measure, and an item unit metric. In some embodiments, generating the user interface further comprises generating a second user interface associated at least in part with the item descriptor information, configured to overlay the user interface and to receive an item quantity selection from a user of the second user interface in terms of the item unit of measure and the item unit metric. In some embodiments, the interface configuration information comprises at least one of a prefix, a suffix, a header, a footer, a device identifier, or a predefined set of interface configuration parameters. In some embodiments, the quantity selection module 1130 is further configured to receive item descriptor information comprising at least one of: an operative unit describing one or more characteristics of the item in terms of the item unit of measure, an item name, an image of the item, a source identifier of the item, or a characteristic quality value at least in part describing a popularity or a quality of the item.

Figure 12:
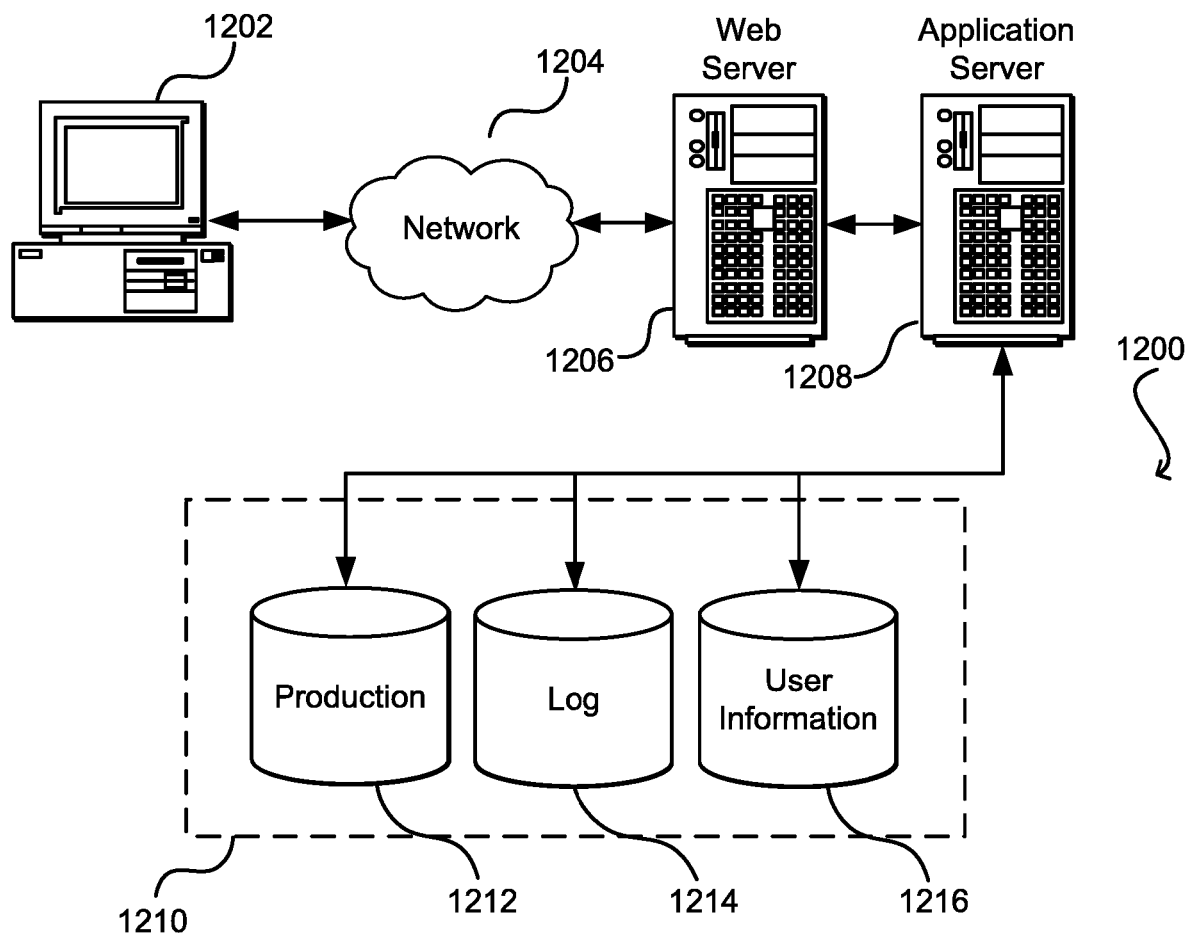
FIG. 12 is a diagram illustrating aspects of an example environment for implementing aspects in accordance with various embodiments.

FIG. 12 is a diagram illustrating aspects of an example environment for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, or the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, interface configuration information for describing at least one characteristic of a user interface, the interface configuration information comprising a pre-defined set of interface configuration parameters, the pre-defined set of interface configuration parameters including a software identifier and alternative configurations for one or more environments, the one or more environments including one or more of a mobile-browsing environment, a browser environment for a desktop computer or laptop computer, or an augmented reality environment;
   receiving, by the computing device, item descriptor information for describing an item to be presented in the user interface, the item descriptor information comprising a characteristics quality value that describes a popularity of the item or a quality of the item, and one or more types of functional descriptions that include at least one of a nonlinear function, an arithmetic function, or a graduated scheduling based at least in part on a type of the item, the popularity of the item including a score;
   receiving, by the computing device, an item unit of measure for describing a quantity of the item in terms of a dimensional unit;
   receiving, by the computing device, an item unit metric;
   generating, by the computing device, the user interface using the interface configuration information and the item unit of measure;
   generating, by the computing device, a quantity selection interface using the interface configuration information and the item unit metric;
   generating, by the computing device, an estimated item result value using a quantity value and the item unit of measure; and
   transmitting, by the computing device, the user interface, the quantity selection interface, and the estimated item result value to a user device.

2. The computer-implemented method of claim 1, wherein generating, by the computing device, an estimated item result value further comprises:
   generating, by the computing device, an estimated dimensional quantity in terms of the item unit of measure and an integer number quantity.

3. The computer-implemented method of claim 1, further comprising:
   receiving, by the computing device, a user interface template from a data store, wherein generating the user interface further comprises using the user interface template, and wherein generating the quantity selection interface further comprises using the user interface template.

4. The computer-implemented method of claim 1, wherein the item unit metric comprises at least one of an item unit increment by which the item is measured, a maximum quantity of the item, a minimum quantity of the item, or a default item metric comprising at least one of a default item increment, a default minimum quantity, or a default maximum quantity.

5. A computer system, comprising:
a memory configured to store computer-executable instructions; and
one or more processors in communication with the memory and configured to execute the computer-executable instructions to at least:
receive a set of interface configuration instructions comprising an item unit of measure describing a quantity of an item in terms of a dimensional unit and a user interface template, the user interface template configured to receive interface configuration information and item descriptor information for describing the item, the interface configuration information comprising a pre-defined set of interface configuration parameters, the pre-defined set of interface configuration parameters including a software identifier and alternative configurations for one or more environments, the one or more environments including one or more of a mobile-browsing environment, a browser environment for a desktop computer or laptop computer, or an augmented reality environment, the item descriptor information comprising a characteristic quality value that describes a popularity of the item or a quality of the item, and one or more types of functional descriptions that include at least one of a nonlinear function, an arithmetic function, or a graduated scheduling based at least in part on a type of the item, the popularity of the item including a score;
generate the user interface based at least in part on the set of interface configuration instructions;
generate a result value using a quantity value and the item unit of measure; and
transmit the user interface and the result value to a user device.

6. The computer system of claim 5, wherein the set of interface configuration instructions further comprises an item unit metric comprising at least one of an item unit increment by which the item is measured, a maximum quantity of the item, a minimum quantity of the item, or a default item unit metric comprising at least one of a default item increment, a default minimum quantity, or a default maximum quantity.

7. The computer system of claim 6, wherein generating a user interface further comprises:
generating a quantity selection interface using the set of interface configuration instructions, the quantity selection interface comprising at least one of:
one or more selectable quantity values associated at least in part with the item unit increment in a range from the minimum quantity of the item to the maximum quantity of the item; or
a user-fillable field, configured to receive a custom quantity value exceeding the maximum quantity of the item from a user of the quantity selection interface.

8. The computer system of claim 6, wherein the quantity value comprises an integer number quantity or a dimensional quantity value in terms of the item unit of measure and the item unit increment, wherein the computer system is further configured to generate an estimated item quantity in terms of the item unit of measure using the integer number quantity.

9. The computer system of claim 5, wherein the set of interface configuration instructions is configured by a client and is received by the one or more processors via a data store as computer-executable instructions.

10. The computer system of claim 5, wherein the user interface template is further configured to receive an item unit of measure and an item unit metric.

11. The computer system of claim 10, wherein generating the user interface further comprises generating a second user interface associated at least in part with the item descriptor information, configured to overlay the user interface and to receive an item quantity selection from a user of the second user interface in terms of the item unit of measure and the item unit metric.

12. The computer system of claim 5, further comprising receiving item descriptor information comprising at least one of: an operative unit describing one or more characteristics of the item in terms of the item unit of measure, an item name, an image of the item, or a source identifier of the item.

13. A non-transitory computer-readable storage medium storing computer-executable instructions that, when executed by a computer system, configure the computer system to perform operations comprising:
receiving a set of interface configuration instructions comprising an item unit of measure describing a quantity of an item in terms of a dimensional unit and a user interface template, the user interface template configured to receive interface configuration information and item descriptor information for describing the item, the interface configuration information comprising a pre-defined set of interface configuration parameters, the pre-defined set of interface configuration parameters including a software identifier and alternative configurations for one or more environments, the one or more environments including one or more of a mobile-browsing environment, a browser environment for a desktop computer or laptop computer, or an augmented reality environment, the item descriptor information comprising a characteristic quality value that describes a popularity of the item or a quality of the item, and one or more types of functional descriptions that include at least one of a nonlinear function, an arithmetic function, or a graduated scheduling based at least in part on a type of the item, the popularity of the item including a score;
generating the user interface based at least in part on the set of interface configuration instructions;
generating a result value using a quantity value and the item unit of measure; and
transmitting the user interface and the result value to a user device.

14. The non-transitory computer-readable storage medium of claim 13, wherein the set of interface configuration instructions further comprises an item unit metric describing at least one of an item unit increment by which the item is measured, a maximum quantity of the item, a minimum quantity of the item, or a default item unit metric describing a default item increment, default minimum quantity, and default maximum quantity.

15. The non-transitory computer-readable storage medium of claim 14, the operations further comprising:
generating a quantity selection interface using the set of interface configuration instructions, the quantity selection interface comprising:
one or more selectable quantity values associated at least in part with the item unit increment in a range from the minimum quantity of the item to the maximum quantity of the item; and a user-fillable field, configured to receive a quantity value exceeding the maximum quantity of the item from a user of the quantity selection interface.

16. The non-transitory computer-readable storage medium of claim 15, wherein generating the user interface further comprises generating a second user interface associated at least in part with item descriptor information, configured to overlay the user interface and to receive an item quantity selection from a user of the second user interface in terms of the item unit of measure and the item unit metric.

17. The non-transitory computer-readable storage medium of claim 14, wherein the quantity value comprises an integer number quantity or a dimensional quantity value in terms of the item unit of measure and the item unit increment, wherein the computer system is further configured to generate an estimated item quantity in terms of the item unit of measure using the integer number quantity.

18. The non-transitory computer-readable storage medium of claim 13, wherein the set of interface configuration instructions is configured by a client and is received via a data store configured to store a plurality of different interface configuration instructions.

19. The non-transitory computer-readable storage medium of claim 13, wherein the user interface template is further configured to receive at least one of an item unit of measure or an item unit metric.

* * * * *